(12) United States Patent
Matsuzaki

(10) Patent No.: US 9,148,526 B2
(45) Date of Patent: Sep. 29, 2015

(54) IMAGE PROCESSING APPARATUS, INFORMATION PROCESSING APPARATUS, METHOD FOR CONTROLLING IMAGE PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Masanori Matsuzaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/542,406

(22) Filed: Nov. 14, 2014

(65) Prior Publication Data
US 2015/0138588 A1   May 21, 2015

(30) Foreign Application Priority Data

Nov. 20, 2013  (JP) ................................. 2013-240037

(51) Int. Cl.
  *G06K 15/00*  (2006.01)
  *H04N 1/00*   (2006.01)
  *G03G 15/00*  (2006.01)

(52) U.S. Cl.
  CPC ....... *H04N 1/00045* (2013.01); *G03G 15/5062* (2013.01); *G03G 15/55* (2013.01); *H04N 1/00* (2013.01); *H04N 1/00005* (2013.01); *H04N 1/00015* (2013.01); *H04N 1/00034* (2013.01); *H04N 1/00039* (2013.01); *H04N 1/00047* (2013.01); *H04N 1/00058* (2013.01); *H04N 1/00068* (2013.01); *H04N 2201/0094* (2013.01)

(58) Field of Classification Search
  USPC ...................... 358/3.26, 3.27, 1.14, 504, 1.18
  See application file for complete search history.

(56) References Cited

U.S. PATENT DOCUMENTS

| 8,508,725 | B2 * | 8/2013 | Kato ............................. 356/128 |
| 2007/0237529 | A1 | 10/2007 | Katou |
| 2009/0055716 | A1 * | 2/2009 | Hsu ............................... 714/784 |
| 2011/0109921 | A1 | 5/2011 | Paul |
| 2014/0068554 | A1 * | 3/2014 | Novak et al. .................. 717/110 |
| 2014/0177788 | A1 * | 6/2014 | Stevens et al. .................. 378/16 |

FOREIGN PATENT DOCUMENTS

| JP | 2004-140084 | * | 5/2004 | .............. H01L 21/52 |
| JP | 2012022232 A | | 2/2012 | |

* cited by examiner

*Primary Examiner* — Jerome Grant, II
(74) *Attorney, Agent, or Firm* — Canon U.S.A., Inc., IP Division

(57) ABSTRACT

An image processing apparatus including an image forming unit configured to form an image includes a storage unit configured to store a reference feature quantity acquired using a result of measuring a first chart by a measurement device, a first acquisition unit configured to acquire a first feature quantity using a result of measuring a second chart by the measurement device, the second chart being created by the image forming unit, and an estimation unit configured to estimate a defective point generated in the image processing apparatus, by acquiring a second feature quantity from the reference feature quantity stored in the storage unit and the first feature quantity acquired by the first acquisition unit and using data in which the second feature quantity is associated with information about a defect generated in the image processing apparatus.

16 Claims, 10 Drawing Sheets

FIG.5
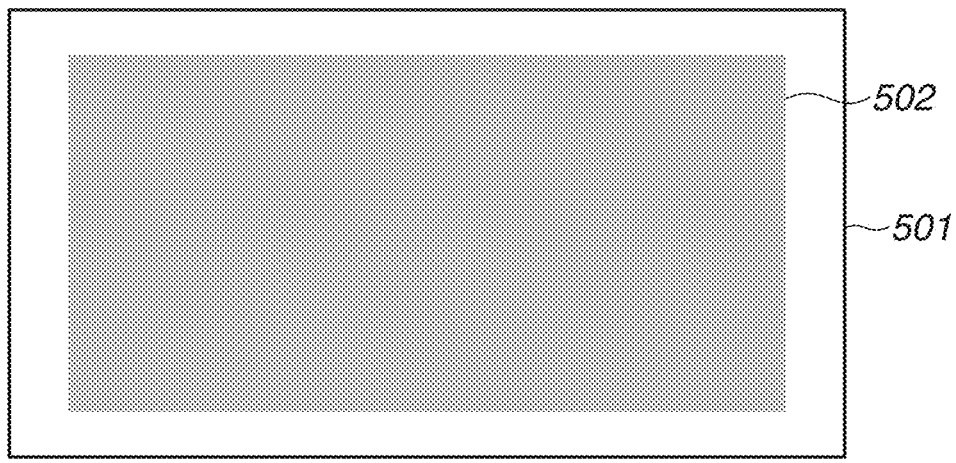
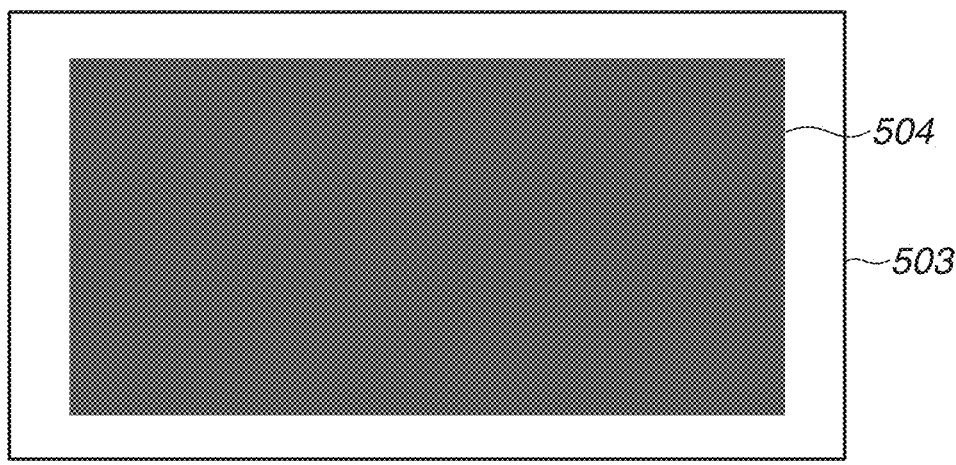
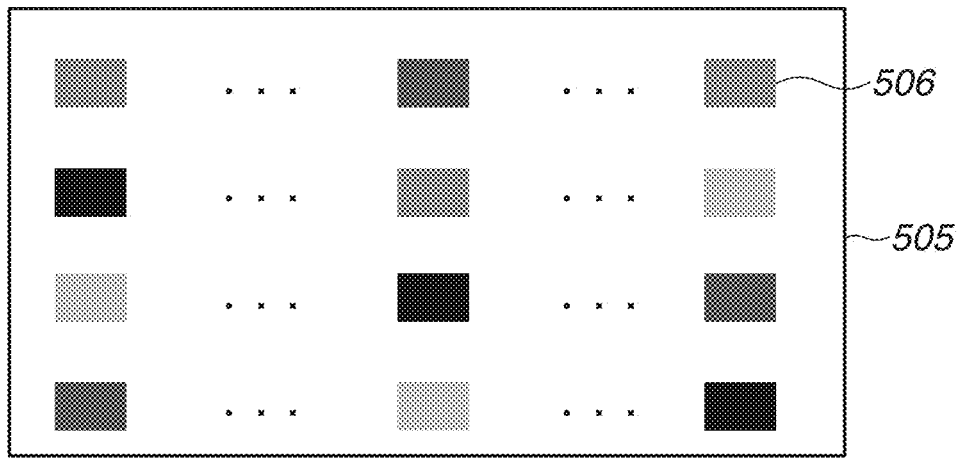

| IMAGE FEATURE QUANTITY (D) | DEFECTIVE POINT (H) |
|---|---|
| A | FIXING DEVICE |
| C | FIXING DEVICE |
| A | FIXING DEVICE |
| C | DEVELOPMENT DEVICE |
| B | FIXING DEVICE |
| D | CALIBRATION YET TO BE EXECUTED |
| E | NO DEFECTIVE POINT |
| C | DEVELOPMENT DEVICE |
| B | FIXING DEVICE |
| A | TRANSFER DRUM |

FIG.8

| IMAGE FEATURE QUANTITY (D) | DEFECTIVE POINT (H) | DETERIORATION DEGREE |
|---|---|---|
| A | FIXING DEVICE | SMALL |
| C | FIXING DEVICE | SMALL |
| A | FIXING DEVICE | MEDIUM |
| C | DEVELOPMENT DEVICE | LARGE |
| B | FIXING DEVICE | SMALL |
| D | CALIBRATION YET TO BE EXECUTED | SMALL |
| E | ABSENCE OF DEFECTIVE POINT | SMALL |
| C | DEVELOPMENT DEVICE | MEDIUM |
| B | FIXING DEVICE | LARGE |
| A | TRANSFER DRUM | SMALL |

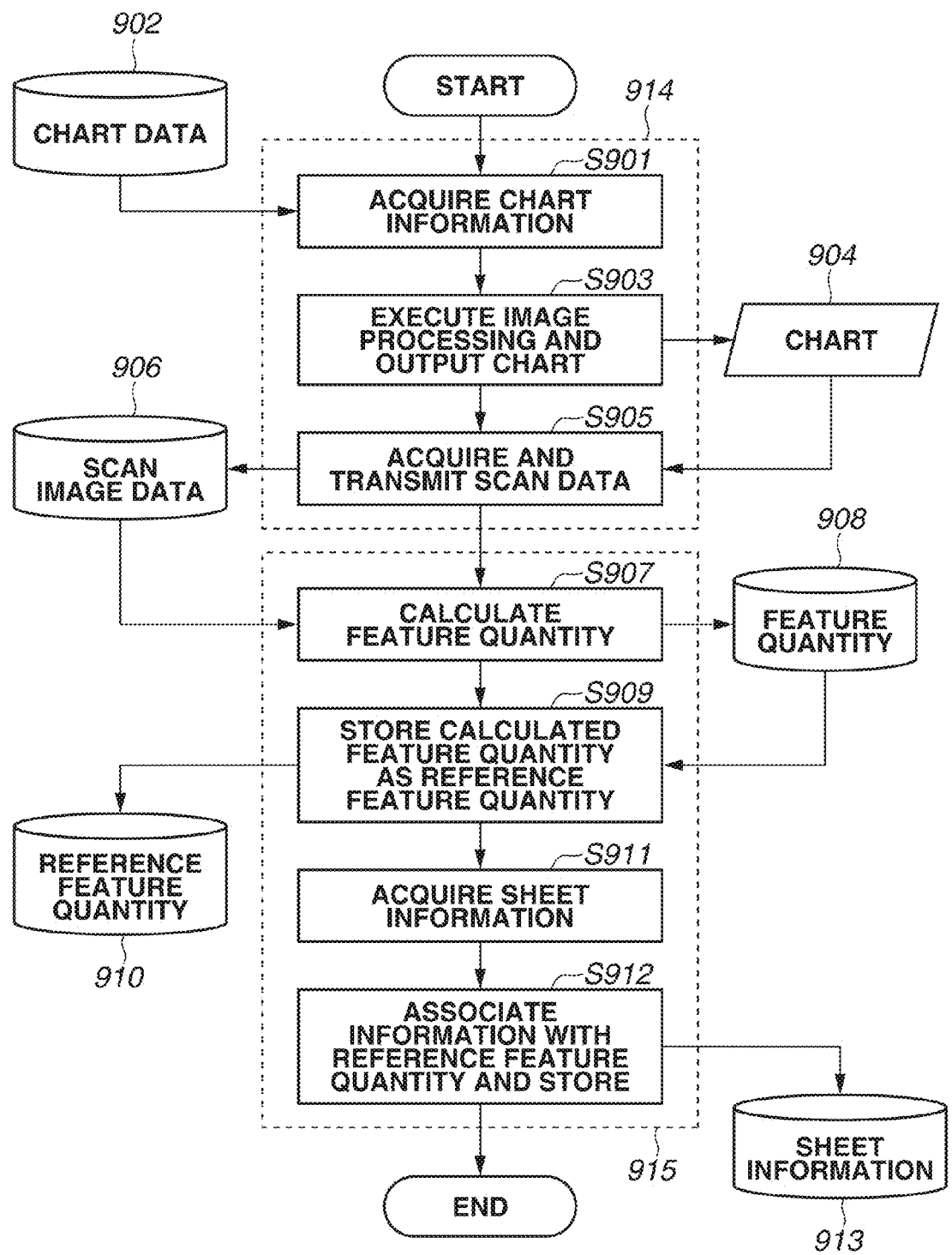

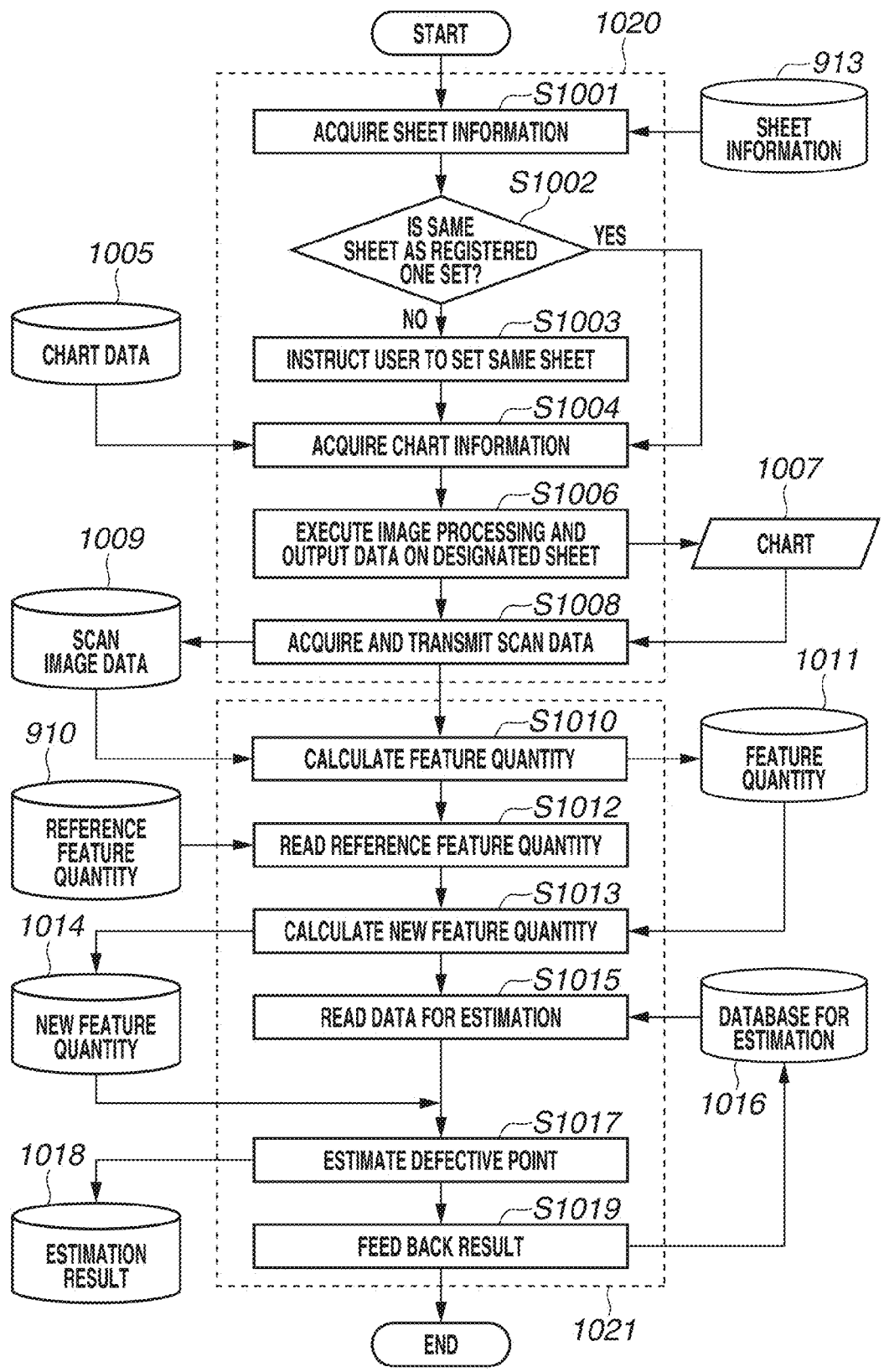

IMAGE PROCESSING APPARATUS, INFORMATION PROCESSING APPARATUS, METHOD FOR CONTROLLING IMAGE PROCESSING APPARATUS, METHOD FOR CONTROLLING INFORMATION PROCESSING APPARATUS, AND STORAGE MEDIUM

BACKGROUND OF THE INVENTION

1. Field of the Invention

The present invention relates to an image processing apparatus, an information processing apparatus, a method for controlling the image processing apparatus, a method for controlling the information processing apparatus, and a storage medium, which are for estimating, if a defect occurs in a printer, a point of the defect.

2. Description of the Related Art

In recent years, as the performance of an electrophotographic apparatus has been improved, there has been provided an electrophotographic apparatus which realizes image quality equal to that of an offset printing machine. It is essential to maintain high image quality in order to operate the apparatus in a similar way to the printing machine, but a long-time use deteriorates a printer of an electrophotographic apparatus to possibly cause abnormality in the image quality of the image output from the printer. It is difficult to automatically detect an "abnormal image" caused by such deterioration, by using a sensor or the like. In many cases, a serviceman or the like receives a request for repair from a user and repairs the printer. However, it is difficult to express the abnormal image in words. Even though unevenness is observed, for example, if detailed information such as the direction in which the unevenness occurs, the frequency of the unevenness, and the cycle thereof is unknown, the cause cannot be identified. For this reason, when the user notifies the serviceman of the abnormal image, the serviceman has been required to visit a site and confirm the abnormality in the image quality. The serviceman who visits the site used to estimate the defective point, identify related service parts, return to a service center to acquire the service parts, and then visit the user again to respond to the abnormality. Performing such processes incurs many costs for the transportation of the serviceman and causes downtime because the machine cannot be used until the repair ends, which significantly decreases the user productivity.

In view of the foregoing, Japanese Patent Application Laid-Open No. 2012-22232 discusses a technique for easily identifying an "abnormal image" by outputting an image from a printer, acquiring a scanned image of the output image, and detecting abnormality.

However, the prior art does not mention the individual variations among scan devices used in identifying the abnormal image and the deterioration thereof. While a scanner mounted in an electrophotographic apparatus satisfies specific standards, the standards are based on the assumption that they are applied to normal copying or transmission processing. For this reason, the standards allow individual variations to a certain extent so long as they do not bother the user, so variations such as those in color reproduction characteristics and resolution variations, for example, have been observed. In addition, even through the use of the scanner for a long time deteriorates the performance of the scanner, in many cases, the deterioration does not matter so much for performing copying or transmission processing.

On the other hand, the technique for identifying the "abnormal image" requires higher scanner accuracy, as compared with the case of copying or the like, because the abnormality in the image quality needs to be confirmed. This causes such a problem that applying the scanner mounted in the electrophotographic apparatus affects the result due to the influence of individual variations and deterioration of the scanners, so that the abnormality in the image quality cannot be accurately confirmed.

Since different correction units for respective items such as color and resolution are required for calibrating the scanner itself, the user needs to execute a plurality of correction processes in advance, which lowers work efficiency. Furthermore, a managed chart which satisfies the standards is required to calibrate the scanner, which incurs costs. In addition, it is difficult to maintain accuracy because the chart itself deteriorates.

The technique for merely identifying the "abnormal image" requires the serviceman to estimate the cause of the "abnormal image," which may vary depending on the skill of the serviceman. If the result is inappropriate, the serviceman needs to repeat processes of estimating the cause of the "abnormal image" and handling the case. Consequently, the downtime is not solved and the user productivity is decreased.

SUMMARY OF THE INVENTION

According to an aspect of the present invention, an image processing apparatus including an image forming unit configured to form an image includes a storage unit configured to store a reference feature quantity acquired using a result of measuring a first chart by a measurement device, a first acquisition unit configured to acquire a first feature quantity using a result of measuring a second chart by the measurement device, the second chart being created by the image forming unit, and an estimation unit configured to estimate a defective point generated in the image processing apparatus, by acquiring a second feature quantity from the reference feature quantity stored in the storage unit and the first feature quantity acquired by the first acquisition unit and using data in which the second feature quantity is associated with information about a defect generated in the image processing apparatus.

According to an exemplary embodiment of the present invention, it is possible to estimate a defective point which occurs in an image processing apparatus, from an abnormal image without receiving influence of variations in scanner characteristics. Accordingly, it becomes easier to respond to the abnormal image. For this reason, the cost of the serviceman can be reduced and a user productivity decrease caused after the abnormal image is generated can be mitigated. The defective point may be a component part or sub-assembly of the image processing apparatus for example, or an area or location within the image processing apparatus.

Further features of the present invention will become apparent from the following description of exemplary embodiments with reference to the attached drawings.

BRIEF DESCRIPTION OF THE DRAWINGS

FIG. 5 illustrates charts for acquiring a feature quantity according to the first exemplary embodiment.

FIG. 6 illustrates an example of a database for estimating a defect occurrence point according to the first exemplary embodiment.

FIG. 8 illustrates an example of a database for estimating a defect occurrence point according to the second exemplary embodiment.

FIG. 9 is a flowchart illustrating processing for storing a reference feature quantity according to a third exemplary embodiment.

FIG. 10 is a flowchart illustrating processing for estimating a defect occurrence point from the reference feature quantity according to the third exemplary embodiment.

DESCRIPTION OF THE EMBODIMENTS

Various exemplary embodiments, features, and aspects of the invention will be described in detail below with reference to the drawings.

Exemplary embodiments of the present invention will be described below. A first exemplary embodiment describes a method for estimating a defect occurrence point and cause for the defect (point of failure and cause for the failure) by acquiring a feature quantity from an abnormal image while excluding the influence of variations in scanner characteristics.

Figure 1:
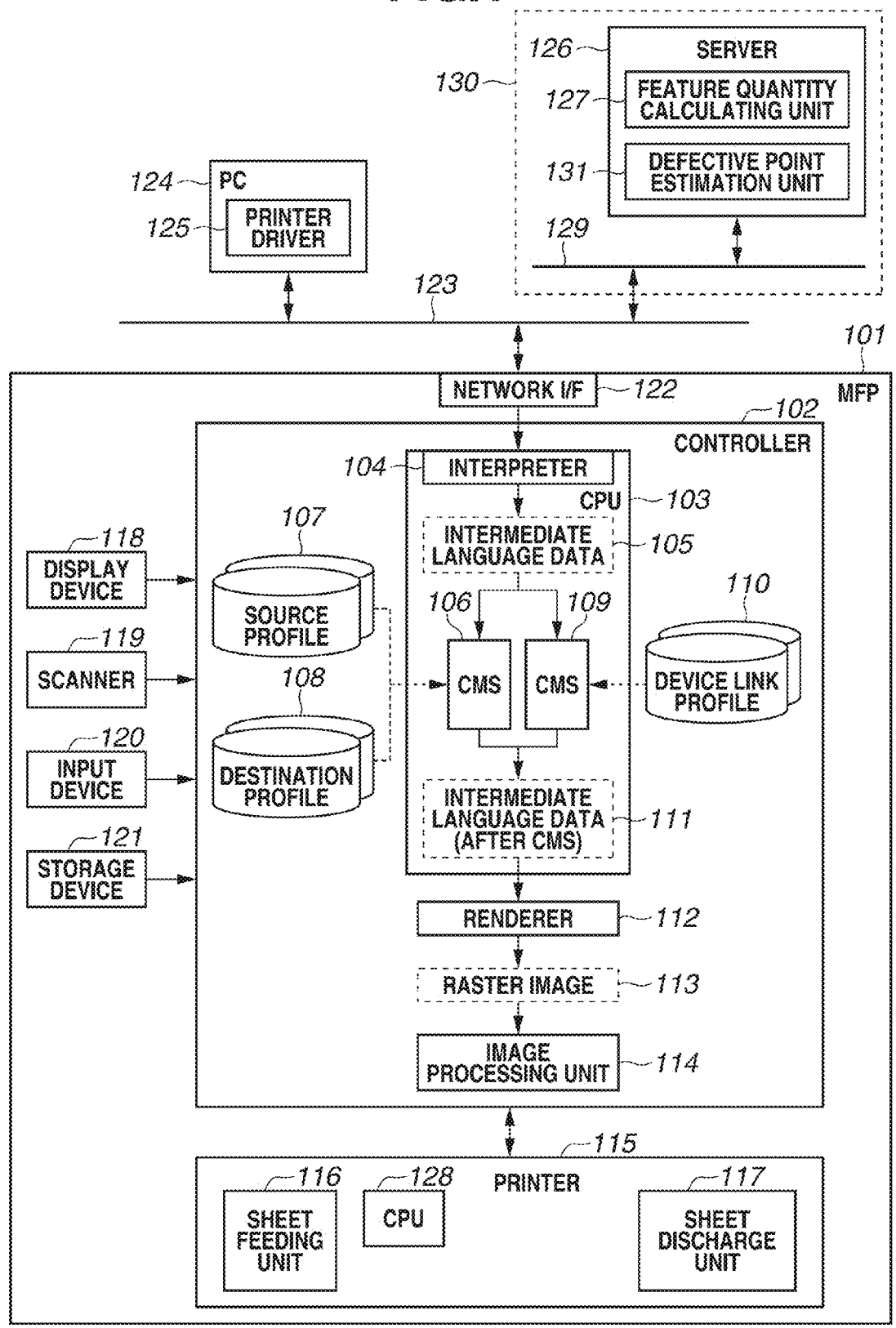
FIG. 1 is a block diagram of a system.

FIG. 1 is a block diagram of a system according to the present exemplary embodiment. A multifunction printer (MFP) 101 using toners of cyan, magenta, yellow, and black (hereinafter referred to as C, M, Y, and K) is connected to other network apparatuses via a network 123. A personal computer (PC) 124 is connected with the MFP 101 via the network 123. A printer driver 125 in the PC 124 transmits print data to the MFP 101.

The MFP 101 will be described in detail below. A network interface (I/F) 122 receives print data or the like. A controller 102 includes a central processing unit (CPU) 103, a renderer 112, and an image processing unit 114. An interpreter 104 in the CPU 103 interprets a page description language (PDL) portion of the received print data to generate intermediate language data 105.

A CMS (color management system) 106 performs color conversion using a source profile 107 and a destination profile 108 to generate intermediate language data (after the CMS) 111. The CMS performs color conversion using profile information described below. The source profile 107 is a profile for converting a device-dependent color space such as a red-green-blue (RGB) color space and a CMYK color space into a device-independent color space such as an L*a*b* (hereinafter referred to as Lab) color space and an XYZ color space defined by the International Commission on Illumination (CIE). Similar to the Lab color space, the XYZ color space is a device-independent color space, and represents color by tristimulus values. The destination profile 108 is a profile for converting a device-independent color space into a device-dependent CMYK color space (a CMYK color space dependent on a printer 115).

A CMS 109 performs color conversion using a device link profile 110 to generate the intermediate language data (after the CMS) 111. The device link profile 110 is a profile for directly converting a device-dependent color space such as an RGB color space and a CMYK color space into a device-dependent CMYK color space (a CMYK color space dependent on the printer 115). Which CMS is selected depends on setting in the printer driver 125.

In the present exemplary embodiment, the CMSs (106 and 109) are separately provided according to the types of the profiles (107, 108, and 110). A plurality of types of profiles, however, may be handled by one CMS. The type of the profile is not limited to the example cited in the present exemplary embodiment, and any type of the profile may be used as long as the device-dependent CMYK color space dependent on the printer 115 is used.

The renderer 112 generates a raster image 113 from the generated intermediate language data (after the CMS) 111. The image processing unit 114 performs image processing on the raster image 113 and an image read by a scanner 119. The image processing unit 114 will be described in detail below.

The printer 115 connected with the controller 102 is a printer for forming output data on a sheet using color toner such as C, M, Y, and K. The printer 115 is controlled by a CPU 128 and includes a sheet feeding unit 116 for feeding a sheet and a sheet discharge unit 117 for discharging the sheet on which output data is formed.

A display device 118 is a user interface (UI) for displaying an instruction to the user and the state of the MFP 101. The display device 118 is used not only for copying and transmission processing, but also for storing a reference feature quantity and estimating a defect occurrence point, which will be described below.

The scanner 119 is a scanner including an automatic document feeder. In the scanner 119, an image of a bundle of documents or a single document is irradiated with a light source (not illustrated) and the image reflected from the document is formed by a lens on a solid-state image sensor such as a charge coupled device (CCD) sensor. A raster-shaped image reading signal is obtained as image data from the solid-state image sensor.

An input device 120 is an interface for receiving input from the user. A part of the input device 120 is made of a touch panel, so that it is integrated with the display device 118.

A storage device 121 stores data processed by the controller 102, data received by the controller 102, and the like.

A server 126 functioning as an information processing apparatus is installed at an external station 130 different from a place where the MFP 101 and the PC 124 used by the user are located. The serviceman or the like who handles defects or the like is on standby at the external station 130. The server 126 is connectable with the MFP 101 via an external network 129, and includes a feature quantity calculating unit 127 and a defective point estimation unit 131. The detailed processing performed by the feature quantity calculating unit 127 and the defective point estimation unit 131 will be described below.

Figure 2:
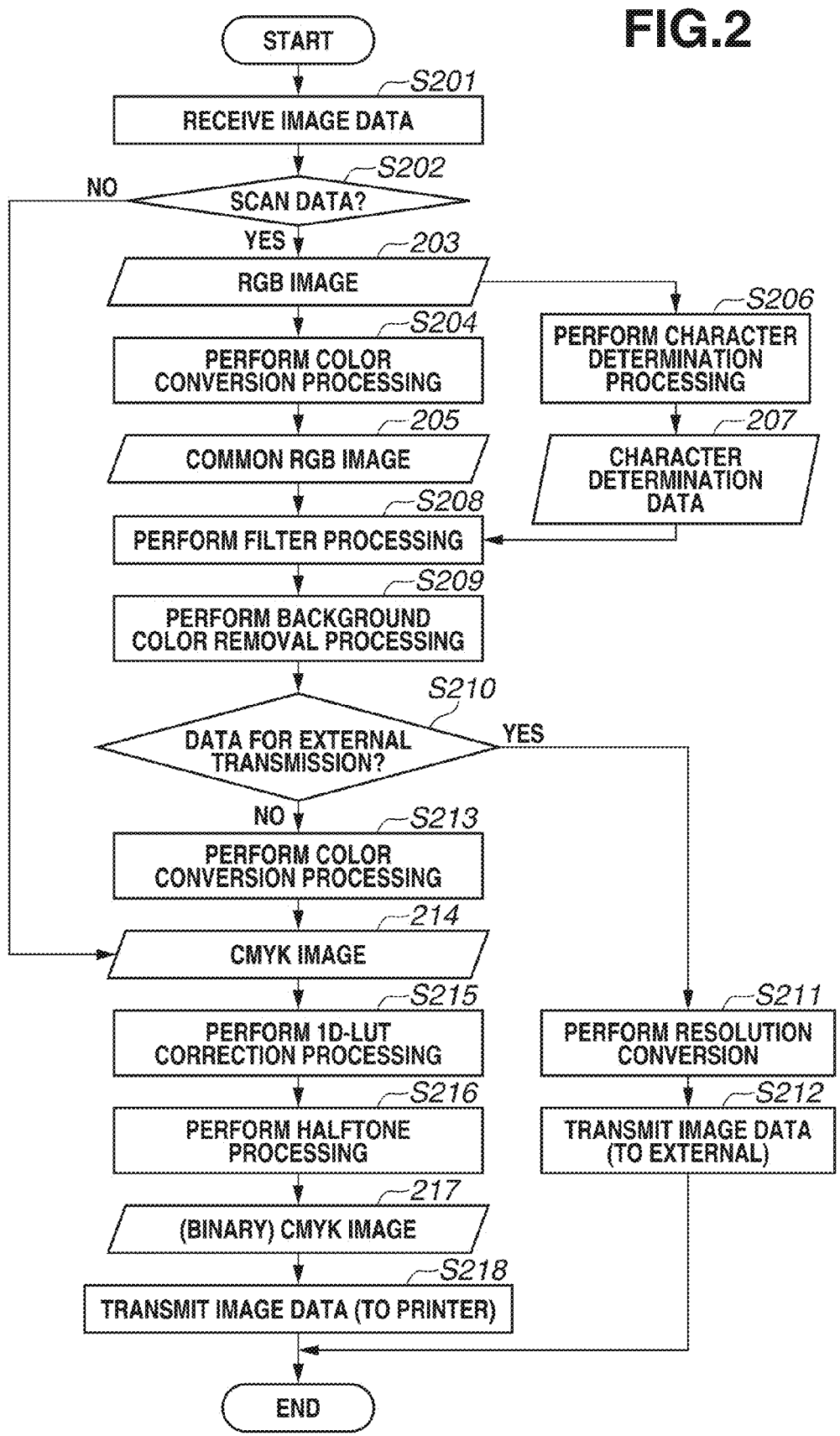
FIG. 2 is a flowchart illustrating image processing.

Next, the operation flow of the image processing unit 114 will be described below with reference to FIG. 2. FIG. 2 is a flowchart illustrating the image processing which is performed on the raster image 113 and the image read by the scanner 119. The flow of the processing illustrated in FIG. 2 is realized by an application specific integrated circuit (ASIC) (not illustrated) included in the image processing unit 114 executing each process.

In step S201, the image processing unit 114 receives image data. Then in step S202, the image processing unit 114 determines whether the received data is scan data received from the scanner 119 or the raster image 113 transmitted from the printer driver 125.

If the data is not scan data (NO in step S202), the received data is the raster image 113 which is bitmap-rasterized by the renderer 112. That is, the raster image 113 is a CMYK image 214 which has been converted into a device-dependent CMYK color space dependent on the printer, by the CMS.

If the received data is the scan data (YES in step S202), the received data is an RGB image 203. For this reason, in step S204, the image processing unit 114 performs color conversion processing to generate a common RGB image 205. The common RGB image 205 is defined by a device-independent RGB color space and can be converted into a device-independent color space such as an Lab color space by calculation.

Meanwhile, in step S206, the image processing unit 114 performs character determination processing to generate character determination data 207. In the present exemplary embodiment, the image processing unit 114 detects an edge or the like of the image to generate the character determination data 207.

Next, in step S208, the image processing unit 114 performs filter processing on the common RGB image 205 using the character determination data 207. At this time, the image processing unit 114 performs different types of filter processing on a character portion and the other portions using the character determination data 207. In step S209, the image processing unit 114 performs background color removal processing to remove background color components.

Next, in step S210, the image processing unit 114 determines whether the input data is data for external transmission. If the input data is data for external transmission (YES in step S210), in step S211, the image processing unit 114 performs resolution conversion in accordance with the resolution setting selected by the user via the display device 118 and the input device 120. In step S212, the image processing unit 114 transmits the image data to the PC 124 or the server 126 residing outside.

If the image processing unit 114 determines that the input data is not the data for external transmission (NO in step S210), in step S213, the image processing unit 114 performs color conversion processing to generate the CMYK image 214. Then, in step S215, the image processing unit 114 corrects the gradation characteristics of the respective colors of C, M, Y, and K using a one-dimensional look up table (1D-LUT). The 1D-LUT refers to a one-dimensional look up table for correcting the respective colors of C, M, Y, and K.

Finally, in step S216, the image processing unit 114 performs image forming processing such as screen processing and error diffusion processing to generate a (binary) CMYK image 217. In step S218, the image processing unit 114 transmits the image data to the printer 115.

In the present exemplary embodiment, when the abnormal image is generated, a chart is printed by the printer 115 and scanned by the scanner 119 to acquire a feature quantity, and a defective point is estimated using the acquired feature quantity. This technique will be described below.

The scanner 119 mounted in the MFP 101 is a device used for normal copying and transmission processing and thus the characteristic variations are permitted to a certain extent.

The characteristic refers to a luminance value influenced by an optical characteristic, resolving power (a modulation transfer function (MTF)), or geometric characteristics such as color misregistration, for example, and the characteristic varies within a range defined by the standards.

The reason why such variations are permitted is that, even if there is a difference in copy results between two types of machines, for example, the difference does not matter unless a person's visual characteristics include sensitivity for the difference. On the other hand, if a defective point is estimated by acquiring a "feature quantity" obtained from the scanned abnormal image as an absolute value, the absolute value varies depending on variations in scanner characteristics, which may change the estimation result. The present exemplary embodiment describes a method for estimating a defective point from the abnormal image without receiving the above-mentioned influence of variations in scanner characteristics.

In the present exemplary embodiment, two types of processing, which are "processing for storing a reference feature quantity" and "processing for estimating a defective point using the reference feature quantity," are performed. The former is executed in a situation where no abnormal image is generated, for example, when an apparatus is shipped from a factory or when an apparatus is installed at a site of a user. The latter is executed in a situation where an abnormal image is generated at a site of a user.

Figure 3:
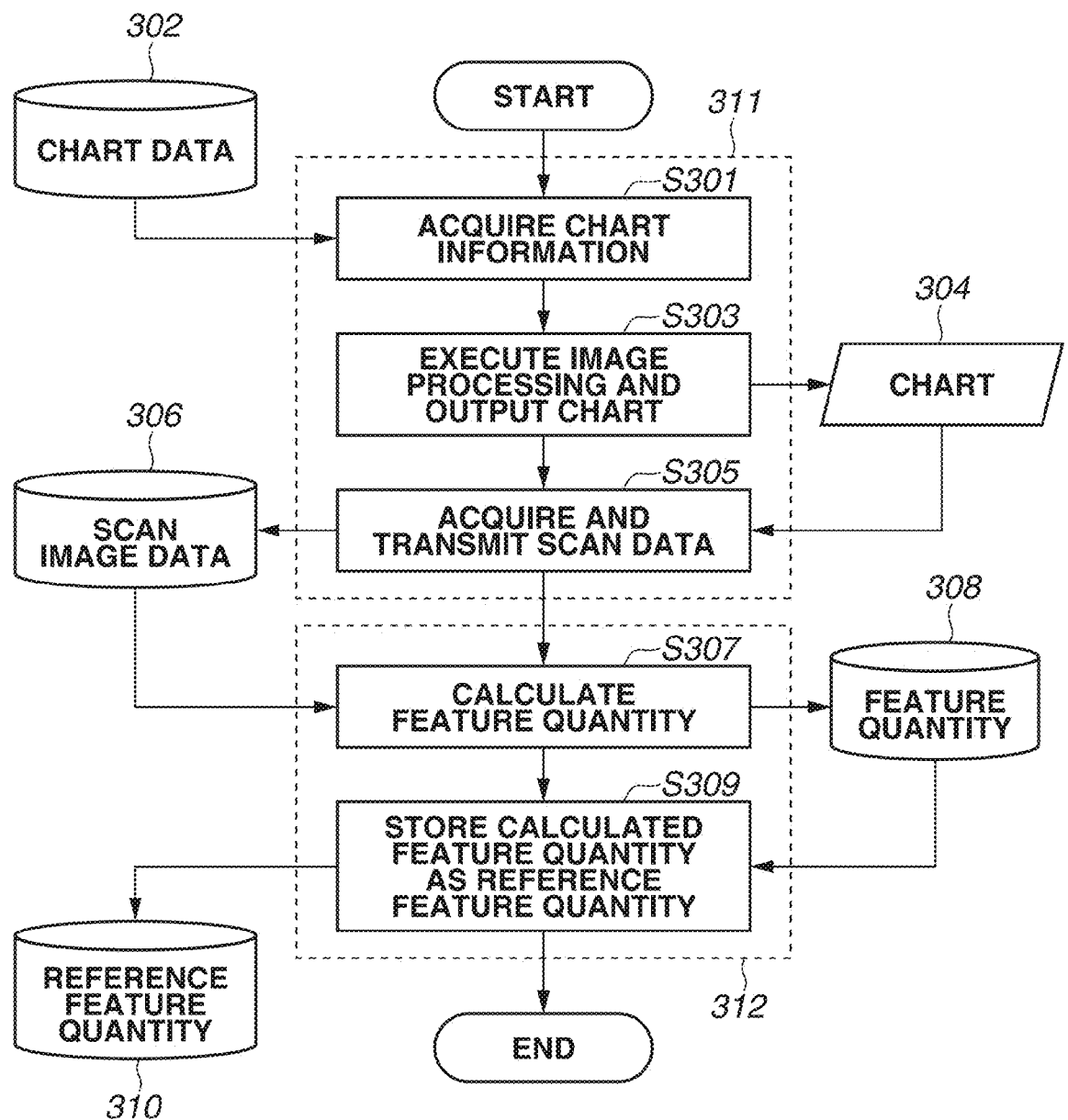
FIG. 3 is a flowchart illustrating processing for storing a reference feature quantity according to a first exemplary embodiment.

FIG. 3 is a flowchart illustrating processing for storing a reference feature quantity according to the present exemplary embodiment. Processing 311 from steps S301 to S305 in the flow of the processing is realized by the CPU 103 in the controller 102 executing each process, and the obtained data is stored in the storage device 121. The display device 118 displays an instruction to the user on a UI. The input device 120 receives an instruction from the user. Processing 312 from steps S307 to S309 is executed by the feature quantity calculating unit 127 and the defective point estimation unit 131 in the server 126. An input device and a display device, which are not illustrated, in the server 126 issue instructions to the serviceman.

In step S301, the CPU 103 acquires chart information from chart data 302.

The chart can comprise any sort of image or pattern that can be used to measure output characteristics, and suitable examples will be described below with reference to FIG. 5. Charts 501, 503, and 505 are examples of the chart. Data 502 in the chart 501 is formed by halftone signal values which are uniform throughout the surface, and is used for detecting an abnormal image such as unevenness. Data 504 in the chart 503 is formed by maximum-density signal values which are uniform throughout the surface, and is used for detecting an abnormal image such as streaks. Data 506 in the chart 505 is formed by a plurality of rectangular data different in signal values, such as color data, gray data, and monochrome data, and is used for detecting an abnormal image such as a color reproducibility defect. The chart data is not limited to the above-described ones and any chart data may be used as long as an abnormal image can be detected using the chart data.

Thus, in order to detect an abnormal image, a plurality of charts may be measured to measure a plurality of types of patterns, or a single representative chart may be measured.

In step S303, the image processing unit 114 performs image processing on the chart data 302, and the printer 115 outputs a chart 304.

The chart 304 is output in a state where the printer 115 is determined to be in a normal state (without defects or failures). Therefore, the measurement result of the chart 304 has values free from any influence due to an abnormality in the printer 115. The chart 304 has only to be the one that is output in a state where the printer 115 is determined to be in a normal state (without defects or failures). The chart 304, which has been printed on a sheet in advance, may be stored, and this chart 304 may be repetitively used.

In step S305, the CPU 103 acquires scan data, which is the measurement result obtained using the scanner 119, and executes transmission processing via the image processing unit 114 to transmit scan image data 306 to the server 126.

In step S307, the feature quantity calculating unit 127 performs feature quantity calculating processing on the scan image data 306, and outputs a feature quantity 308. The feature quantity 308 will be described below. For the charts 501 and 503, frequency conversion processing is performed by using Fourier transformation or the like, and a calculated power spectrum is taken as a frequency feature quantity. When the frequency conversion is performed, a plurality of rectangular areas each having the specific number of pixels may be defined at a plurality of points, and a plurality of power spectra may be calculated. The position of the rectangular area may be previously defined or the serviceman may be caused to specify the position using a display device or an input device, which are not illustrated, in the server 126.

For the chart 505, common RGB data is converted into a device-independent Lab color space and the Lab values of a plurality of rectangular data is taken as a color feature quantity.

In the present exemplary embodiment, examples of the feature quantity are described as the frequency feature quantity and the color feature quantity. The feature quantity may be, however, any other feature quantities. An edge acquired from the chart of a character/a line, or a histogram acquired from a pixel value, for example, may be taken as the feature quantity. The feature quantity may be acquired for each rectangular area, band, or image. Finally, in step S309, the calculated feature quantity is stored as a reference feature quantity 310 in a storage device (not illustrated) in the server 126, and the processing ends.

If a single chart is divided into a plurality of areas and a feature quantity is acquired from each area, a plurality of reference feature quantities 310 is acquired.

Next, referring to FIG. 4, description will be given of the flow of the processing for estimating a defective point using the reference feature quantity calculated in the processing illustrated in FIG. 3. The processing for estimating a defective point is executed when an abnormal image is generated in the MFP 101 used by the user. Processing 417 from steps S401 to S405 in the flow of the processing is realized by the CPU 103 in the controller 102 executing each process, and the obtained data is stored in the storage device 121. The display device 118 displays an instruction to the user on a UI. The input device 120 receives an instruction from the user. Processing 418 from steps S407 to S416 is executed by the feature quantity calculating unit 127 and the defective point estimation unit 131 in the server 126. An input device and a display device, which are not illustrated, in the server 126 issue instructions to the serviceman.

In step S401, the CPU 103 acquires chart information from chart data 402. The chart data 402 used here is similar to the chart data 302.

Next, in step S403, the image processing unit 114 performs image processing on the chart data 402, and the printer 115 outputs a chart 404. In step S405, the CPU 103 acquires scan data using the scanner 119 and executes transmission processing via the image processing unit 114 to transmit scan image data 406 to the server 126.

Next, in step S407, the feature quantity calculating unit 127 performs feature quantity calculating processing on the scan image data 406, and outputs a feature quantity 408 (a first feature quantity). The feature quantity and the method for calculating the feature quantity described here are similar to those described in step S307 where the feature quantity 308 is calculated in FIG. 3. The feature quantity 408 may be acquired for each rectangular area, band, or image. If the feature quantity is acquired from a plurality of areas, a plurality of feature quantities is acquired.

In step S409, the feature quantity calculating unit 127 reads the reference feature quantity 310 calculated in the flow of the processing illustrated in FIG. 3. In step S410, the feature quantity calculating unit 127 calculates a new feature quantity 411 (a second feature quantity) from the reference feature quantity 310 and the feature quantity 408.

The reason why the new feature quantity 411 is calculated will be described below. The feature quantity 408 is calculated from the image data read by the scanner 119, so the feature quantity 408 is influenced by the variations in characteristics of the scanner 119. More specifically, variations in color reproducibility and resolution affect the Lab values and frequency analysis result. This produces a difference between the values obtained when a chart is read by the scanner 119 of the MFP 101 and those obtained when the same chart is read by a scanner of another MFP (not illustrated), which produces a difference in the acquired feature quantities. In the present exemplary embodiment, the calculation of the new feature quantity 411 solves this problem.

A method for calculating the new feature quantity 411 will be described below. The calculation method varies depending on the type of the feature quantity. The method will be described using the frequency feature quantity and the color feature quantity as examples.

The new feature quantity 411 of the frequency feature quantity is calculated by Equation (1).

$$FS = |PS - PS_b| \quad (1)$$

where, PS is an acquired power spectrum and $PS_b$ is a power spectrum as a reference. In Equation (1), an absolute value FS of a difference between the feature quantity 408 and the reference feature quantity 310 is taken as the new feature quantity 411. Needless to say, any method for calculating the new feature quantity 411 may be used, so the new feature quantity 411 may be calculated by obtaining a ratio, for example.

The new feature quantity 411 of the color feature quantity is calculated by the following Equation (2).

$$\Delta E = \sqrt{(L-L_b)^2 + (a-a_b)^2 + (b-b_b)^2} \quad (2)$$

where, L, a, and b are the obtained Lab values and $L_b$, $a_b$, and $b_b$ are Lab values as reference. In Equation (2), a color difference $\Delta E$ between the feature quantity 408 and the reference feature quantity 310 is taken as the new feature quantity 411. Needless to say, any method for calculating the new feature quantity 411 may be used, so the new feature quantity 411 may be calculated by using another color difference calculation equation, for example.

If a plurality of the reference feature quantities 310 and a plurality of the feature quantities 408 are acquired from a single chart, the new feature quantity 411 is acquired from the reference feature quantity 310 and the feature quantity 408 which are acquired from the same area of the chart.

Conventionally, there has been "calibration" processing for correcting variations in scanner characteristics. Its correction accuracy is, however, limited, so that the variations that fail to be corrected affect estimation result of a defective point. Furthermore, a chart serving as a correction reference is required to calibrate the scanner. This chart is costly because the chart should be managed to satisfy specific standards. In addition, various feature quantities such as a color feature quantity and a frequency feature quantity are required for estimating a defective point, which requires a plurality of types of calibration processing corresponding to respective items such as color and resolution. On the other hand, the present exemplary embodiment uses a method for "eliminating" or diminishing the influence of variations in scanner characteristics by storing, as the reference feature quantity, the feature quantity acquired from the image data previously read by the scanner 119. For this reason, this method is more advantageous than the conventional technique in that estimation accuracy is improved, there is no need to perform prior correction processing before a defective point is estimated, and the method is not costly because a special chart is not required.

In step S412, a database for estimation 413 is acquired. In step S414, a defective point is estimated to calculate an estimation result 415. The calculated estimation result 415 is displayed by a display device (not illustrated) in the server 126.

A method for estimating a defective point from the feature quantity using the database for estimation 413 will be described with reference to FIG. 6.

In a database 601, an image feature quantity acquired when an abnormal image is generated is associated with a defective point which causes the abnormal image. An image feature quantity (D) is classified into three types of feature quantities A to C with a threshold set for the new feature quantity 411. The number of types for classification is not limited. A defective point (H) indicates a defective point which the serviceman has actually handled when the image feature quantity (D) is acquired. All the defective points indicate components in the examples, but actually, there exist cases where a defect does not exist or the adjustment function of the MFP 101 can solve a defect. For this reason, non-physical causes such as cases where "no defective point exist" or "calibration processing is yet to be executed" are also defined as one of "defective points" in the present exemplary embodiment.

In addition, in the present exemplary embodiment, since the frequency feature quantity and the color feature quantity are calculated, there exists a plurality of databases 601. Needless to say, the image feature quantity (D) may be calculated from a plurality of feature quantities to create the database. The database 601 may be created using not only serviceman's handling result but also data previously predicted at the time of design or past product data.

A method for estimating a defective point using the database 601 will be described. As an example, a method using the Bayes' expansion formula will be described. The Bayes' expansion formula is expressed by Equation (3).

$$P(Hi|D) = \frac{P(D|Hi)P(Hi)}{(P(D|H1)P(H1) + P(D|H2)P(H2) + \ldots + P(D|Hn)P(Hn))} \quad (3)$$

where, P(H|D) is posterior probability, P(H) is prior probability, and P(D|H) is likelihood.

Description will be given using the database 601 as an example.

P(H) represents the probability of defective point occurrence, and is called prior probability. Referring to FIG. 6, in a fixing device, a failure occurs five times out of 10 times, so that P(H)=5/10=0.5.

P(D|H) represents the probability of occurrence of the image feature quantity (D) in the defective point (H), and is called likelihood. Referring to FIG. 6, while a defect occurs five times in the fixing device, the image feature quantity A occurs twice, so that P(D|H)=2/5=0.4.

P(H|D) represents the probability that a cause for the occurrence of the image feature quantity (D) is the defective point (H), and is called posterior probability. That is to say, the calculation of the posterior probability allows the defective point to be represented by probability, and the defective point with the highest probability would be the estimation result of the defective point. Needless to say, not only the defective point with the highest probability but also all the defective points with upper probabilities may be provided for the serviceman.

According to the estimated defective point, the serviceman handles the detect. Then, in step S416, the defective point which the serviceman has actually handled is taken as a handling result and fed back to the database for estimation 413. Thus, feeding back the handling result updates the database for estimation 413 and improves accuracy of next estimation.

While the example of estimating a defective point using the Bayes' expansion formula has been described in the present exemplary embodiment, any method may be used as long as the method enables the estimation of the defective point.

In addition, in the present exemplary embodiment, the server 126 calculates the feature quantity, however, the MFP 101 may calculate the feature quantity and transmit the calculated feature quantity. Similarly, the MFP 101 may estimate the defective point. Furthermore, another server (not illustrated) may be used to calculate the feature quantity and estimate the defective point.

While the scan image is acquired using the scanner 119 in the present exemplary embodiment, a value obtained using another measurement device and a value calculated from the obtained value may be taken as the feature quantity.

The present exemplary embodiment enables the estimation of a defective point from an abnormal image without receiving influence of variations in scanner characteristics, and enables the serviceman to handle the abnormal image more easily compared with a conventional technique. This can reduce a cost for the serviceman and mitigate a user productivity decrease caused after the abnormal image is generated.

Next, the following describes a second exemplary embodiment in which the defective point of the printer is estimated in consideration of deterioration of the scanner itself.

The above first exemplary embodiment has described the flow of processing for estimating a defective point without receiving influence of variations in scanner characteristics by previously storing the reference feature quantity.

Nevertheless, despite being less likely to change compared with the printer, the scanner is also likely to change in characteristics due to aging deterioration or increase in the number of times of use. The influence of the deterioration on the scanner changes the previously acquired feature quantity, leading to a change in the estimation result of the defective point.

In view of the above situation, the present exemplary embodiment will describe an example of estimating a defective point while taking account of the influence due to deterioration of the scanner.

The flow of the processing in the present exemplary embodiment will be described below. The flow of the processing for storing the reference feature quantity is similar to that in the first exemplary embodiment, so that the description thereof is omitted.

Figure 7:
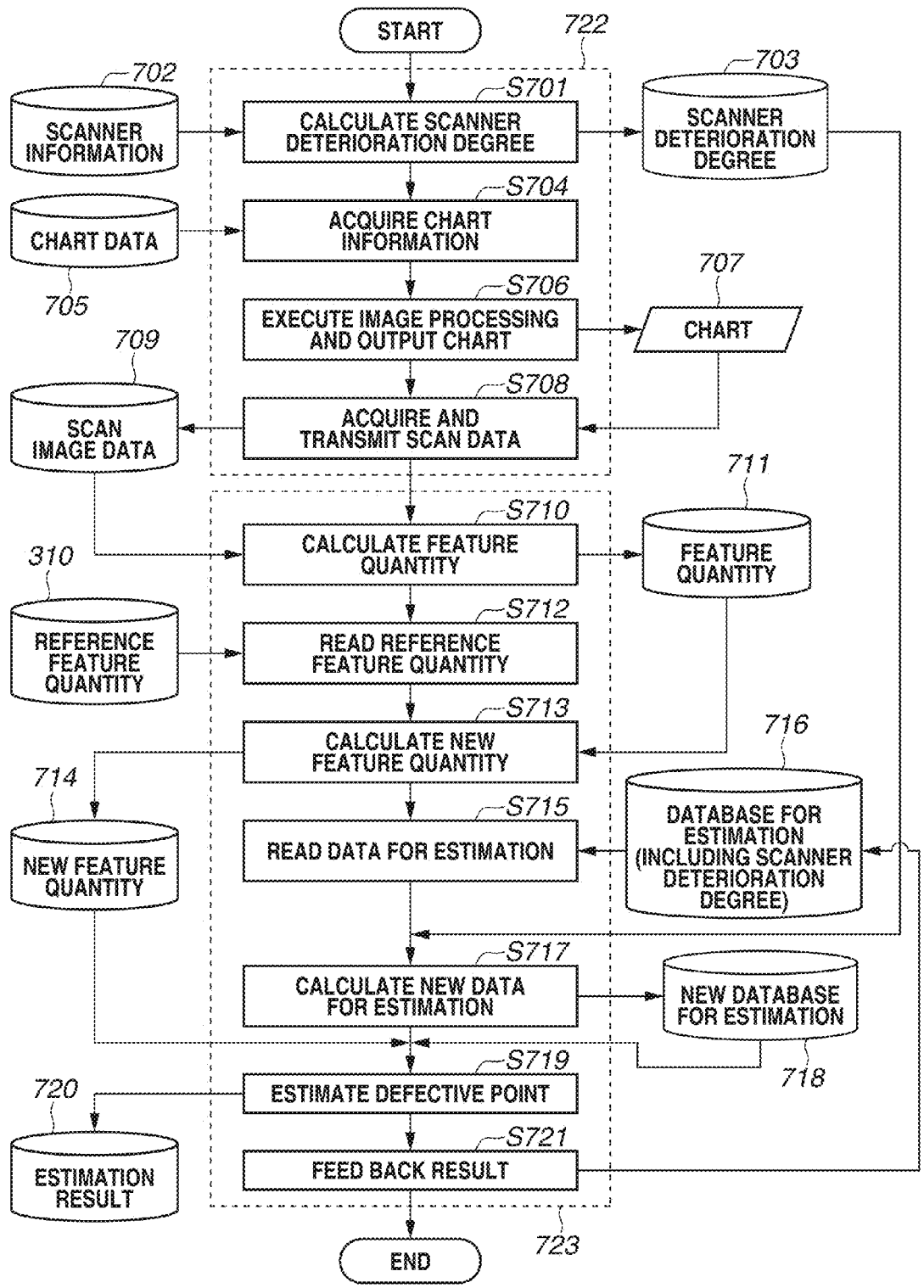
FIG. 7 is a flowchart illustrating processing for estimating a defect occurrence point from a reference feature quantity according to a second exemplary embodiment.

The flow of the processing for estimating a defective point in consideration of deterioration of the scanner according to the present exemplary embodiment will be described below with reference to FIG. 7. Processing 722 from steps S701 to S708 in the flow of the processing is realized by the CPU 103 in the controller 102 executing each process, and the obtained data is stored in the storage device 121. The display device 118 displays an instruction to the user on a UI. The input device 120 receives an instruction from the user. Processing 723 from steps S710 to S721 is executed by the feature quantity calculating unit 127 and the defective point estimation unit 131 in the server 126. An input device and a display device, which are not illustrated, in the server 126 issue instructions to the serviceman.

In step S701, the CPU 103 reads scanner information 702 to calculate a scanner deterioration degree 703. The scanner information 702 refers to information about items which affect scanner deterioration, including years passing after installation, information about an installation environment, and the number of scannings. Threshold processing is performed based on these items of information to determine the scanner deterioration degree by three grades of small, medium, and large. Any item of scanner information may be used as long as the item affects deterioration. The scanner deterioration degree may be expressed in other ways than the three grades of small, medium, and large.

Figure 4:
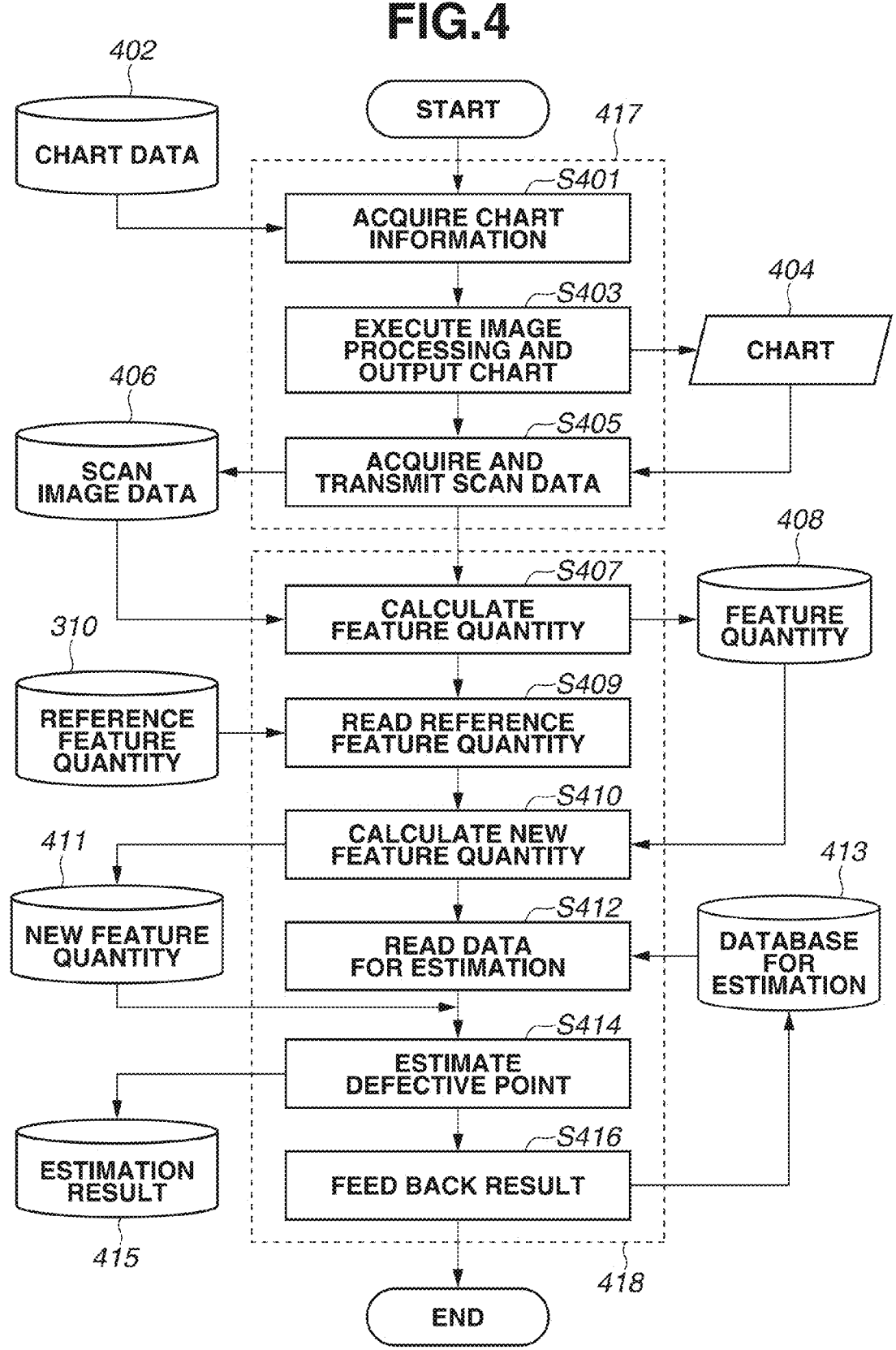
FIG. 4 is a flowchart illustrating processing for estimating a defect occurrence point using the reference feature quantity according to the first exemplary embodiment.

The flow of the processing for calculating a new feature quantity 714 in steps S704 to S713 is similar to the flow of the processing for calculating the new feature quantity 411 in steps S401 to S410 in FIG. 4, so that the description thereof is omitted.

Next, in step S715, data for estimation is read from a database for estimation 716. The database for estimation 716 is different from that in the processing in FIG. 4, and includes information about a scanner deterioration degree. FIG. 8 illustrates an example of the database. A database 801 is an example of a database for estimation including information about a scanner deterioration degree. Information about a deterioration degree is included in addition to the image feature quantity (D) and the defective point (H). The database 801 is created by adding the scanner deterioration degree at the time of estimating a defective point to the image feature quantity (D) previously acquired using a system for estimating a defect and the defective point (H) which the serviceman has actually handled.

In step S717, a new database for estimation 718 is created using the database for estimation 716 and the scanner deterioration degree 703. Description will be given using the database 801 as an example. If a scanner deterioration degree is small, for example, among the items in the database 801, only items indicating "SMALL" as the deterioration degree are extracted, and taken as the new database for estimation 718.

Then, in step S719, the defective point estimation unit 131 uses the new database for estimation 718 and the new feature quantity 714 to estimate a defective point, and outputs the defective point as an estimation result 720. A method for estimating a defective point is similar to that in the processing in FIG. 4, so that the description thereof is omitted.

Finally, in step S721, the serviceman's actual handling result is fed back to the database for estimation 716. At this moment, the scanner deterioration degree 703 is also added as information.

Although the flow of the processing for creating a new database for estimation using information about a scanner deterioration degree has been described above, a warning massage may be displayed according to the scanner deterioration degree, instead of creating the database for estimation. For example, if deterioration is large, a method for notifying the user/the serviceman that the deterioration may affect determination accuracy may be used. Alternatively, processing for calculating a new image feature quantity by multiplying the feature quantity by a coefficient according to the deterioration degree may be performed instead of creating the new database for estimation according to the deterioration degree, or the defective point may be estimated by adding the deterioration to the feature quantity.

The present exemplary embodiment enables the estimation of a defective point from an abnormal image without receiving influence of variations in scanner characteristics, and enables the serviceman to handle the abnormal image more easily compared with a conventional technique. This can reduce a cost for the serviceman and mitigate a user productivity decrease caused after the abnormal image is generated.

Furthermore, the present exemplary embodiment enables the estimation of a defective point from an abnormal image without receiving influence due to deterioration of the scanner, so that estimation accuracy of a defective point is improved.

Next, the following describes a third exemplary embodiment in which a defective point of the printer is estimated in consideration of sheet information.

In the above exemplary embodiments, the description has been given of the flow of processing for estimating a defective point without receiving influence of variations in scanner characteristics by previously storing the reference feature quantity. The description has also been given of the flow of processing for estimating a defective point in consideration of influence of changes in scanner characteristics.

Nevertheless, if different types of sheets are used at the time of storing the reference feature quantity and at the time of estimating a defective point, the finally acquired feature quantity would be affected, which may change estimation result of a defective point. For example, since plain paper and coated paper have different color reproduction ranges, if a defective point of a case where an image is output on the coated paper is estimated while taking as a reference the data of a case where an image is output on the plain paper, the output image may be determined to be an abnormal image despite no problem existing in the printer.

In view of the above situation, in the present exemplary embodiment, an example will be described in which the influence of a sheet is taken into consideration when registering the reference feature quantity and estimating a defective point.

FIG. 9 is a flowchart illustrating processing for storing the reference feature quantity according to the present exemplary embodiment. Processing 914 from steps S901 to S905 in the flow of the processing is realized by the CPU 103 in the controller 102 executing each process, and the obtained data is stored in the storage device 121. The display device 118 displays an instruction to the user on a UI. The input device 120 receives an instruction from the user. Processing 915 from steps S907 to S912 is executed by the feature quantity calculating unit 127 and the defective point estimation unit 131 in the server 126. An input device and a display device, which are not illustrated, in the server 126 issue instructions to the serviceman.

The flow of the processing for acquiring a reference feature quantity 910 in steps S901 to S909 is similar to the flow of the processing for acquiring the new reference feature quantity 310 in steps S301 to S309 in FIG. 3, so that the description thereof is omitted.

In step S911, sheet information at the time of acquiring a chart 904 is acquired. The sheet information refers to information about the grammage of a sheet, the color of a sheet, and the type of a sheet such as plain paper and coated paper. Since the sheet information is set on a cassette (not illustrated) in the MFP 101, the sheet information can be acquired by identifying which cassette stores a sheet onto which the chart 904 is output. In step S912, acquired sheet information 913 is associated with the reference feature quantity 910 and stored.

Next, the flow of the processing for estimating a defective point using the reference feature quantity 910 and the sheet information 913 calculated in the processing in FIG. 9 will be described below with reference to FIG. 10. The estimation of the defective point is processing executed when an abnormal image is generated in the MFP 101 used by the user. Processing 1020 from steps S1001 to S1008 in the flow of the processing is realized by the CPU 103 in the controller 102 executing each process, and the obtained data is stored in the storage device 121. The display device 118 displays an instruction to the user on a UI. The input device 120 receives an instruction from the user. Processing 1021 from steps S1010 to S1019 is executed by the feature quantity calculating unit 127 and the defective point estimation unit 131 in the server 126. An input device and a display device, which are not illustrated, in the server 126 issue instructions to the serviceman.

First, in step S1001, the CPU 103 acquires the sheet information 913 stored in the flow of the processing in FIG. 9. Next, in step S1002, the CPU 103 confirms the sheet information set on a cassette (not illustrated) in the MFP 101. If the sheet information corresponding to the sheet information 913 is not set to the cassette (NO in step S1002), in step S1003, the CPU 103 instructs the user to set the same sheet as the one set at the time of registering the reference into the cassette. If the same sheet as the one set at the time of registering the reference is set in the cassette (YES in step S1002), the CPU 103 executes the processing in step S1004 and the subsequent steps.

The flow of the processing for estimating a defective point in steps S1004 to S1019 is similar to the flow of the processing in steps S401 to S416 in FIG. 4, so that the description thereof is omitted.

The present exemplary embodiment enables the estimation of a defective point from an abnormal image without receiving influence of variations in scanner characteristics, and enables the serviceman to handle the abnormal image more easily compared with a conventional technique. This can reduce a cost for the serviceman and mitigate a user productivity decrease caused after the abnormal image is generated.

Furthermore, the present exemplary embodiment can prevent a decrease in estimation accuracy due to a difference in sheet between at the time of registering the reference and at the time of estimating a defect.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-240037 filed Nov. 20, 2013, which is hereby incorporated by reference herein in its entirety.

What is claimed is:

1. An image processing apparatus including an image forming unit configured to form an image, the image processing apparatus comprising:
    a storage unit configured to store a reference feature quantity acquired using a result of measuring a first chart by a measurement device;
    a first acquisition unit configured to acquire a first feature quantity using a result of measuring a second chart by the measurement device, the second chart being created by the image forming unit; and
    an estimation unit configured to estimate a defective point generated in the image processing apparatus, by acquiring a second feature quantity from the reference feature quantity stored in the storage unit and the first feature quantity acquired by the first acquisition unit and using data in which the second feature quantity is associated with information about a defect generated in the image processing apparatus.

2. The image processing apparatus according to claim 1, wherein the second chart is created by the image forming unit in a case where an instruction is received from a user.

3. The image processing apparatus according to claim 1, wherein the second chart includes one type of a pattern or a plurality of types of patterns for acquiring the first feature quantity.

4. The image processing apparatus according to claim 1, wherein the reference feature quantity is a value indicating a characteristic of the measurement device.

5. The image processing apparatus according to claim 1, wherein the second feature quantity is a difference between the first feature quantity and the reference feature quantity.

6. The image processing apparatus according to claim 1, wherein the first and second charts are output using same chart data.

7. The image processing apparatus according to claim 1, wherein the data in which the second feature quantity is associated with the information about the defect generated in the image processing apparatus is updated based on information about a defective point confirmed after the estimation unit performs estimation.

8. The image processing apparatus according to claim 1, further comprising:
    a second acquisition unit configured to acquire a deterioration degree of the measurement device,
    wherein the estimation unit estimates a defective point of the image processing apparatus using the data and the deterioration degree of the measurement device acquired by the second acquisition unit.

9. The image processing apparatus according to claim 8, wherein the data in which the second feature quantity is associated with the information about the defect generated in the image processing apparatus is updated using the deterioration degree acquired by the second acquisition unit.

10. The image processing apparatus according to claim 1, wherein, in a case where the second chart is created, a user is urged to use a same type of a sheet as a type of a sheet used for creating the first chart.

11. The image processing apparatus according to claim 1, wherein the storage unit stores a type of a sheet used for creating the first chart.

12. An information processing apparatus comprising:
a first acquisition unit configured to acquire a reference feature quantity which is a result of measuring a first chart by a measurement device;
a second acquisition unit configured to acquire a first feature quantity which is a result of measuring a second chart by the measurement device, after the reference feature quantity is acquired by the first acquisition unit; and
an estimation unit configured to estimate a defective point generated in an image processing apparatus, by acquiring a second feature quantity from the reference feature quantity acquired by the first acquisition unit and the first feature quantity acquired by the second acquisition unit and using data in which the second feature quantity is associated with information about a defect generated in the image processing apparatus.

13. A method for controlling an image processing apparatus including an image forming unit configured to form an image, the method comprising:
storing a reference feature quantity acquired using a result of measuring a first chart by a measurement device;
creating a second chart by the image forming unit;
acquiring a first feature quantity using a result of measuring the second chart by the measurement device; and
estimating a defective point generated in the image processing apparatus, by acquiring a second feature quantity from the stored reference feature quantity and the acquired first feature quantity and using data in which the second feature quantity is associated with information about a defect generated in the image processing apparatus.

14. A control method comprising:
acquiring a reference feature quantity which is a result of measuring a first chart by a measurement device;
acquiring a first feature quantity which is a result of measuring a second chart by the measurement device, after the reference feature quantity is acquired; and
estimating a defective point generated in an image processing apparatus, by acquiring a second feature quantity from the acquired reference feature quantity and the acquired first feature quantity and using data in which the second feature quantity is associated with information about a defect generated in the image processing apparatus.

15. A non-transitory computer-readable storage medium storing a program for causing a computer to execute the control method according to claim 13.

16. A non-transitory computer-readable storage medium storing a program for causing a computer to execute the control method according to claim 14.

* * * * *